US012764643B2

(12) United States Patent
Chen et al.

(10) Patent No.: US 12,764,643 B2
(45) Date of Patent: Oct. 13, 2026

(54) RADIO ACCESS NETWORK CONNECTIVITY ENHANCEMENTS FOR NETWORK SLICING

(71) Applicant: Apple Inc., Cupertino, CA (US)

(72) Inventors: Yuqin Chen, Beijing (CN); Adesh Kumar, San Jose, CA (US); Dawei Zhang, Saratoga, CA (US); Fangli Xu, Beijing (CN); Haijing Hu, Los Gatos, CA (US); Krisztian Kiss, Hayward, CA (US); Naveen Kumar R. Palle Venkata, San Diego, CA (US); Sethuraman Gurumoorthy, San Ramon, CA (US); Srirang A. Lovlekar, Fremont, CA (US); Sudeep Manithara Vamanan, Nuremberg (DE); Vijay Venkataraman, San Jose, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1014 days.

(21) Appl. No.: 17/593,601

(22) PCT Filed: Oct. 22, 2020

(86) PCT No.: PCT/CN2020/122892
§ 371 (c)(1),
(2) Date: Sep. 21, 2021

(87) PCT Pub. No.: WO2022/082628
PCT Pub. Date: Apr. 28, 2022

(65) Prior Publication Data
US 2022/0303884 A1 Sep. 22, 2022

(51) Int. Cl.
*H04W 48/18* (2009.01)
*H04W 72/02* (2009.01)
(Continued)

(52) U.S. Cl.
CPC .......... *H04W 48/18* (2013.01); *H04W 72/02* (2013.01); *H04W 72/0453* (2013.01); *H04W 72/56* (2023.01); *H04W 76/30* (2018.02)

(58) Field of Classification Search
CPC . H04W 48/18; H04W 72/02; H04W 72/0453; H04W 72/56; H04W 76/30
See application file for complete search history.

(56) References Cited

U.S. PATENT DOCUMENTS

2018/0288654 A1 10/2018 Shih et al.
2019/0349774 A1 11/2019 Lou et al.
(Continued)

FOREIGN PATENT DOCUMENTS

CN 109565747 4/2019
CN 110235471 A 9/2019
(Continued)

*Primary Examiner* — Kenny S Lin
(74) *Attorney, Agent, or Firm* — Fay Kaplun & Marcin, LLP

(57) ABSTRACT

A user equipment (UE) is configured to receive cell information including related frequency and network slice information. The UE receives network slice based dedicated priority information for the UE from a currently camped cell, selects a frequency band for camping based on a configured network slice and the network slice based dedicated priority information and establishes a protocol data unit (PDU) session with the configured network slice when camped on the frequency band.

13 Claims, 5 Drawing Sheets

(51) Int. Cl.
*H04W 72/0453* (2023.01)
*H04W 72/56* (2023.01)
*H04W 76/30* (2018.01)

(56) References Cited

U.S. PATENT DOCUMENTS

| | | | | |
|---|---|---|---|---|
| 2019/0364495 | A1 | 11/2019 | Mildh et al. | |
| 2020/0120547 | A1 | 4/2020 | Han et al. | |
| 2020/0305054 | A1* | 9/2020 | Zee | H04W 36/0061 |
| 2020/0337050 | A1* | 10/2020 | Mildh | H04W 72/56 |
| 2021/0037455 | A1* | 2/2021 | Zhu | H04W 76/27 |
| 2021/0105652 | A1* | 4/2021 | Jeong | H04W 76/25 |
| 2021/0112513 | A1* | 4/2021 | Chun | H04W 60/00 |
| 2023/0056855 | A1 | 2/2023 | Jiang | |
| 2023/0189187 | A1* | 6/2023 | Velev | H04W 48/20<br>455/435.1 |

FOREIGN PATENT DOCUMENTS

| | | | | |
|---|---|---|---|---|
| CN | 110268753 A | | 9/2019 | |
| CN | 110769458 | | 2/2020 | |
| CN | 111278016 | | 6/2020 | |
| CN | 111386727 | | 7/2020 | |
| CN | 110235471 B | | 1/2022 | |
| EP | 3589064 | | 1/2020 | |
| EP | 4149172 A1 | * | 3/2023 | H04W 36/24 |
| WO | 2017/140342 | | 8/2017 | |
| WO | 2017/212162 | | 12/2017 | |
| WO | 2019/064274 | | 4/2019 | |
| WO | 2019/134537 | | 7/2019 | |

* cited by examiner

RADIO ACCESS NETWORK CONNECTIVITY ENHANCEMENTS FOR NETWORK SLICING

BACKGROUND

A user equipment (UE) may connect to a network that includes multiple network slices. Generally, a network slice refers to an end-to-end logical network that is configured to provide a particular service and/or possess particular network characteristics. Each network slice may be isolated from one another but run on a shared physical network infrastructure. Thus, each network slice may share network resources but facilitate different functionality.

A particular network slice may only be deployed on certain frequency bands of certain cells. For example, the UE may be within a coverage area of a first cell that operates on two frequency bands (frequency band 1, frequency band 2) and a second cell that operates on one frequency band (frequency band 3). However, the desired network slice may only be deployed on frequency band 1. Therefore, in this example, the UE may only access the desired network slice when camped on frequency band 1 of the first cell.

The UE may camp on a frequency band that does not support access to the network slice the UE intends to utilize. For instance, continuing with the example provided above, the UE may camp on frequency band 3 of the second cell because the UE is not aware that the desired network slice is only accessible on frequency band 1 of the first cell. From the network perspective, the UE camping on a frequency band that does not support access to the desired network slice may cause unnecessary congestion and strain on various aspects of the network. From the UE perspective, this may cause a connectivity issue that requires time and energy to mitigate. Consequently, the UE may experience a degradation in performance and a power drain.

SUMMARY

Some exemplary embodiments are related to a processor of a user equipment (UE) configured to perform operations. The operations include receiving network slice based dedicated priority information for the UE from a currently camped cell, selecting a frequency band for camping based on a configured network slice and the network slice based dedicated priority information and establishing a protocol data unit (PDU) session with the configured network slice when camped on the frequency band.

Other exemplary embodiments are related to a user equipment (UE) including a transceiver configured to communicate with multiple networks and a processor communicatively coupled to the transceiver and configured to perform operations. The operations include receiving network slice based dedicated priority information for a user equipment (UE) from a currently camped cell, selecting a frequency band for camping based on a configured network slice and the network slice based dedicated priority information and establishing a protocol data unit (PDU) session with the configured network slice when camped on the frequency band.

Still further exemplary embodiments are related to a processor of a user equipment (UE) configured to perform operations. The operations include receiving a paging message for the UE from a currently camped cell, identifying a network slice that is the cause of the paging message and performing an operation based on the identified network slice.

Additional exemplary embodiments are related to a user equipment (UE) including a transceiver configured to communicate with multiple networks and a processor communicatively coupled to the transceiver and configured to perform operations. The operations include receiving a paging message for a user equipment (UE) from a currently camped cell, identifying a network slice that is the cause of the paging message and performing an operation based on the identified network slice.

Further exemplary embodiments are related to a processor of a network node configured to perform operations. The operations include receiving allowed network slice selection assistance information (NSSAI) for a user equipment (UE) from a core network, receiving multiple radio access technology (RAT)/frequency selection (RFSP) indexes for the UE from the core network, each RFSP index corresponding to a different network slice, deriving a frequency priority list for each allowed NSSAI based on the multiple RFSP indexes, and transmitting dedicated priority information to the UE, the dedicated frequency priority information including the frequency priority list for each allowed NSSAI.

DETAILED DESCRIPTION

Figure 1:
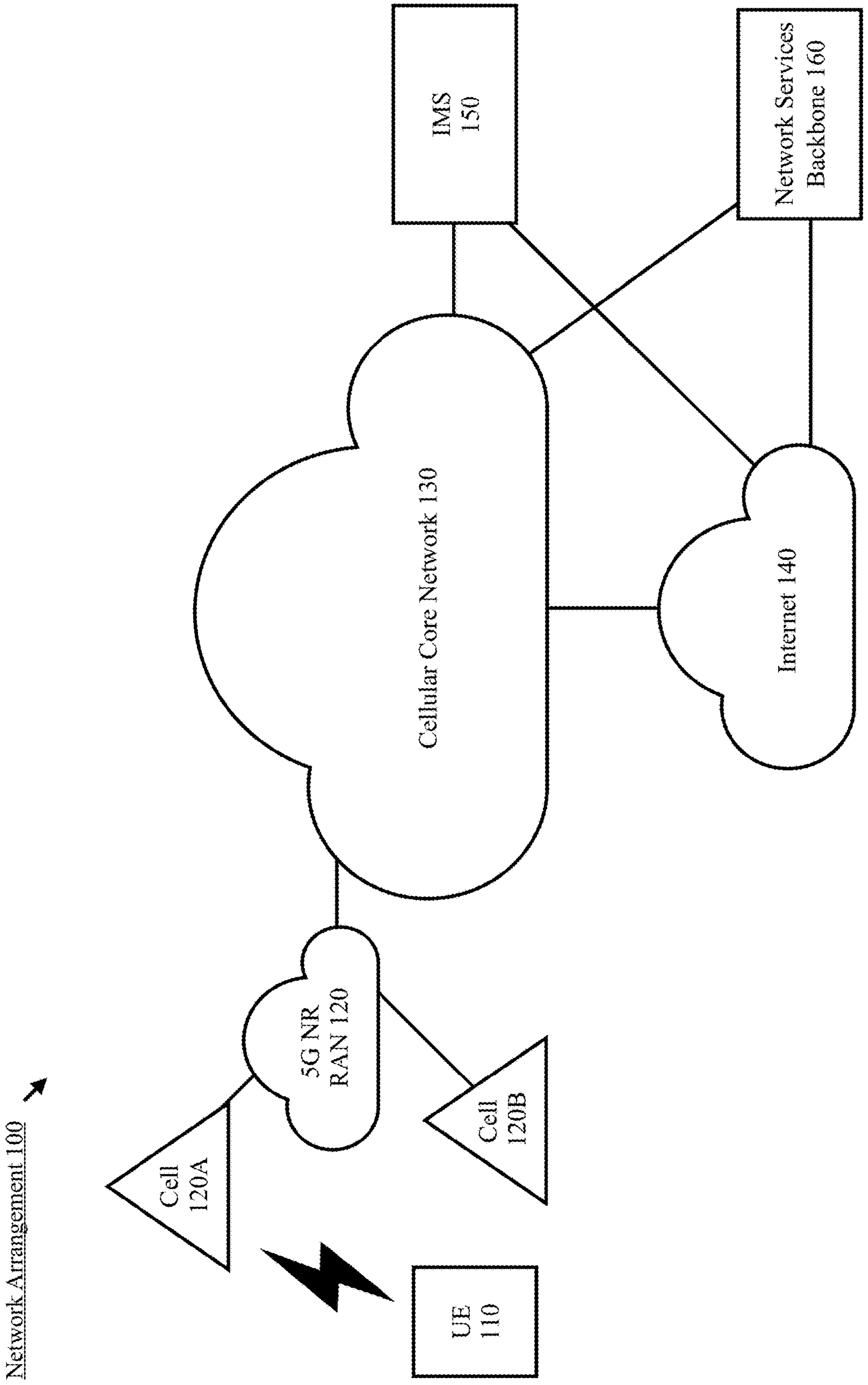
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to implementing connectivity enhancements for a user equipment (UE) in a deployment scenario that includes multiple network slices deployed on multiple frequency bands.

The exemplary embodiments are described with regard to a UE. However, reference to a UE is merely provided for illustrative purposes. The exemplary embodiments may be utilized with any electronic component equipped with hardware, software, and/or firmware configured to exchange information and data with the network. Therefore, the UE as described herein is used to represent any electronic component.

The exemplary embodiments are also described with regard to a fifth generation (5G) network that supports network slicing. Generally, network slicing refers to a network architecture in which multiple end-to-end logical networks run on a shared physical network infrastructure. Each network slice may be configured to provide a particular set of capabilities and/or characteristics. Thus, the physical infrastructure of the 5G network may be sliced into multiple virtual networks, each configured for a different purpose. Throughout this description, reference to a network slice may represent any type of end-to-end logical network that is configured to serve a particular purpose and implemented on the 5G physical infrastructure.

The UE may be configured to utilize one or more network slices. For example, the UE may utilize a first network slice for one or more carrier services (e.g., voice, multimedia messaging service (MMS), Internet, etc.) and second different network slice for a third-party service. To provide an example, the third-party may be the manufacturer of the UE that provides services such as, but not limited to, messaging, streaming multimedia, video calls, etc. In another example, the third-party may be an entity managing a digital platform (e.g., social media, e-commerce, streaming media, etc.). In a further example, the third-party may be an entity providing services for Internet of Things (IoT) devices.

As indicated above, there may be multiple network slices configured for a variety of different purposes. However, the configured purpose of a network slice is beyond the scope of the exemplary embodiments. The exemplary embodiments are not limited to any particular type of network slice. Instead, the exemplary embodiments relate to the UE accessing a particular network slice regardless of its configured purpose.

Those skilled in the art will understand that a network slice may include a RAN slice. Each RAN slice may be deployed on one or more frequency bands. Thus, the UE may access a RAN slice by camping on a frequency band that supports that RAN slice. The exemplary embodiments are described with regard to the UE accessing a particular RAN slice.

Within a network arrangement, a particular RAN slice may only be accessible when camped on certain cells. In addition, the RAN slice may only be deployed on certain frequency bands. For example, the UE may be located within the coverage area of a first cell ("cell A") that operates on a first frequency band ("frequency band 1") and a second frequency band ("frequency band 2") and a second cell ("cell B") that operates on a third frequency band ("frequency band 3") and a fourth frequency band ("frequency band 4"). In this example, only cell A frequency band 1 supports access to the desired RAN slice. Therefore, the UE may only access the desired network slice when camped on cell A frequency 1 because the RAN slice is not deployed on any of the other frequency bands, e.g., frequency band 2, frequency band 3 or frequency band 4.

Under conventional circumstances, for a deployment scenario that includes multiple RAN slices deployed on multiple frequency bands, the UE may be unaware of which frequency bands support access to the network slice the UE intends to utilize. As a result, the UE may select a frequency band or cell for camping that does not support access to the desired network slice. From the network perspective, this may cause unnecessary congestion and strain on various aspects of the network. From the UE perspective, this may cause a connectivity issue that requires time and energy to mitigate. Consequently, the UE may experience a degradation in performance and a power drain. The exemplary embodiments include techniques for providing the UE with relevant RAN slicing information and incorporating the relevant RAN slicing information into subsequent operations.

In one aspect, the exemplary embodiments include implementing dedicated priority configuration enhancements for network slicing. Generally, dedicated priority configuration refers to a concept where the network configures the UE with particular cell reselection priorities. The network may configure the UE in this manner by providing dedicated priority information to the UE. Throughout this description, "dedicated priority information" refers to information that may be considered by the UE when selecting a cell for cell reselection. To provide an example, the network may transmit a radio resource control (RRC) release message to a connected UE. The RRC release message may include dedicated priority information that is to be considered by the UE during a subsequent reselection procedure. The dedicated priority information may identify frequency bands and/or cells that may provide an adequate connection for the UE. In other words, the network may use the dedicated priority information to configure the UE to perform a targeted cell reselection procedure that is different than the default cell reselection procedure.

Under conventional circumstances, dedicated priority information does not include network slice information. As a result, when the network configures the UE to perform targeted cell reselection in accordance with the dedicated priority information, the UE may camp on a frequency band and/or cell that does not support the network slice the UE intends to access. As indicated above, these types of connectivity issues may cause the UE to experience a degradation in performance and a power drain.

The exemplary embodiments relate to implementing dedicated priority information that includes network slice information. This may enable the UE to perform cell reselection in a more efficient manner. Specific examples of generating this exemplary dedicated priority information on the network side and how this exemplary dedicated priority information may be used on the UE side will be provided in detail below.

In another aspect, the exemplary embodiments relate to implementing enhancements for mobile terminating (MT) services in a deployment scenario where multiple RAN slices are deployed on multiple frequency bands. Under conventional circumstances, when the UE receives a paging message, the UE may be unaware that the network slice is the cause of the paging message. Consequently, when the UE establishes a connection in response to paging, the UE may select a frequency band or cell that does not support the network slice that is the cause of the paging. As indicated above, these types of connectivity issues may cause the UE to experience a degradation in performance and a power drain.

The exemplary embodiments include techniques for identifying an association between a network slice and a paging message. This may allow the UE to respond to paging in a more efficient manner. Specific examples of exemplary techniques that may be implemented on the network side and on the UE side will be provided in detail below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g. 5G cloud RAN, a next generation RAN (NG-RAN), a long term evolution RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The RAN 120 may include, cells that are configured to send and receive traffic from UEs that are equipped with the appropriate cellular chip set. In this example, the 5G NR RAN 120 includes cell 120A and cell 120B. However, reference to a cell is merely provided for illustrative purposes, any appropriate cell or base station may be deployed (e.g., Node Bs, eNodeBs, HeNBs, eNBs, gNBs, gNodeBs, macrocells, microcells, small cells, femtocells, etc.).

The cells 120A, 120B may include one or more communication interfaces to exchange data and/or information with camped UEs, the RAN 120, the cellular core network 130, the internet 140, etc. Further, the cells 120A, 120B may include a processor configured to perform various operations. For example, the processor of the cell may be configured to perform operations related to providing the UE 110 with dedicated priority information. However, reference to a processor is merely for illustrative purposes. The operations of the cells 120A, 120B may also be represented as a separate incorporated component of the cell or may be a modular component coupled to the cell, e.g., an integrated circuit with or without firmware. For example, the integrated circuit may include input circuitry to receive signals and processing circuitry to process the signals and other information. In addition, in some cells, the functionality of the processor is split among two or more processors such as a baseband processor and an applications processor. The exemplary embodiments may be implemented in any of these or other configurations of a cell.

Those skilled in the art will understand that any association procedure may be performed for the UE 110 to connect to the 5G NR RAN 120. For example, as discussed above, the 5G NR RAN 120 may be associated with a particular network carrier where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell (e.g., cell 120A, cell 120B).

In addition to the RAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
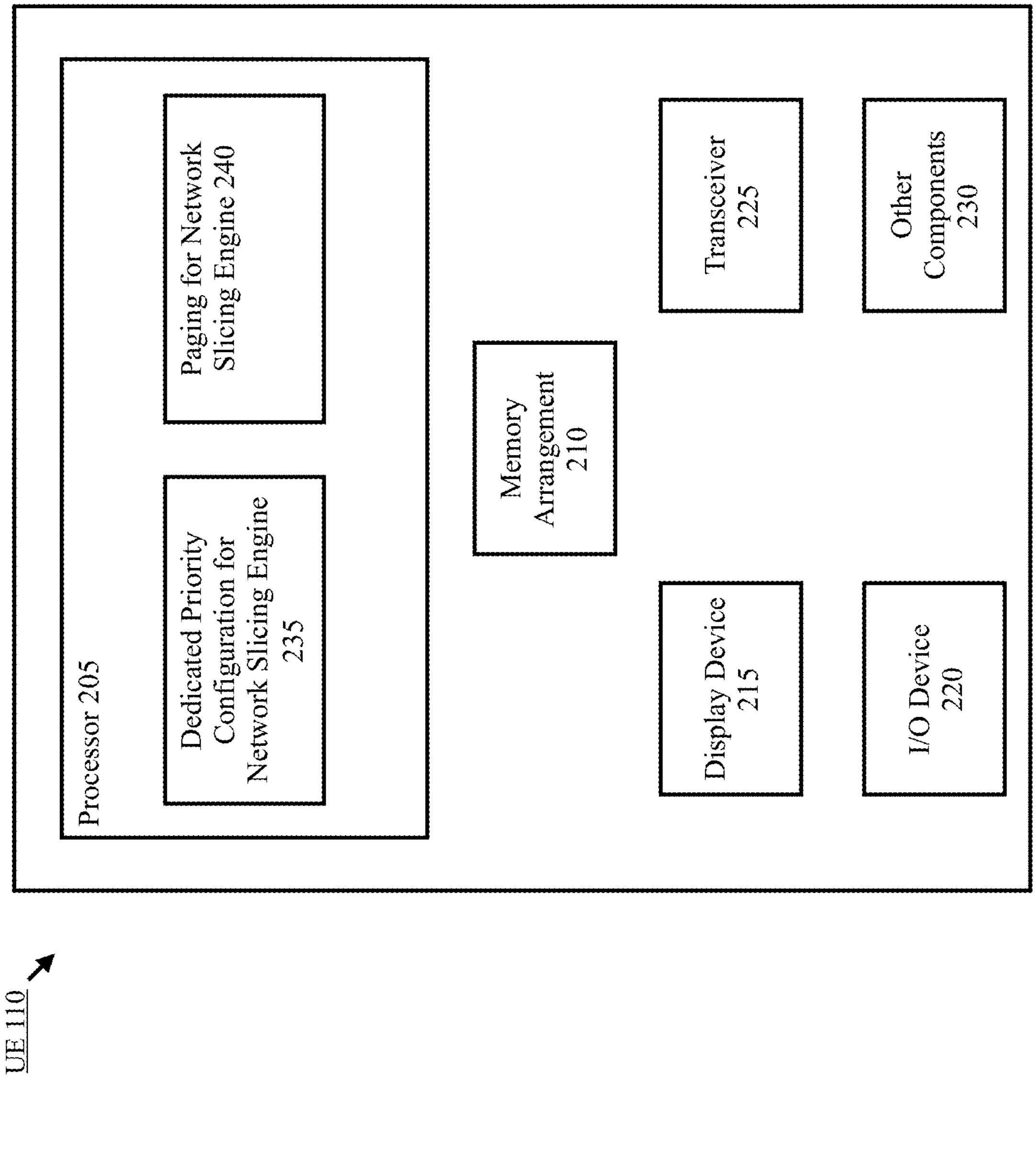
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a dedicated priority configuration for network slicing engine 235 and a paging for network slicing engine 240. The dedicated priority configuration for network slicing engine 235 may perform operations related to targeted cell reselection based on network slice information. The paging for network slicing engine 240 may perform operations related to determining an association between a paging message and a network slice.

The above referenced engines 235, 240 each being an application (e.g., a program) executed by the processor 205 is only exemplary. The functionality associated with the engines 235, 240 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

The exemplary embodiments relate to a deployment scenario in which multiple RAN slices are deployed on multiple frequency bands. Under conventional circumstances, the UE 110 does not possess and/or adequately consider network slice information when selecting a cell, a carrier or a frequency band for camping. As indicated above, this may have a negative impact on UE 110 performance and/or power consumption. In a first aspect, the exemplary embodiments include implementing a dedicated priority configuration for network slicing. The exemplary dedicated priority configuration may allow the UE 110 to perform cell reselection in a more efficient manner when in a deployment scenario that includes multiple RAN slices deployed on multiple frequency bands. In a second aspect, the exemplary embodiments include techniques for identifying an association between a network slice and a paging message. These exemplary techniques may improve the manner in which the UE 110 responds to MT services.

To differentiate between network slices, each network slice may be identified by a single network slice selection assistance information (S-NSSAI). Each instance of a S-NSSAI may be associated with a public land mobile network (PLMN) and may include the slice service type (SST) and a slice descriptor (SD). The SST may identify the expected behavior of the corresponding network slice with regard to services, features and characteristics. Those skilled in the art will understand that the SST may be associated with a standardized SST value. The SD may identify any one or more entities associated with the network slice. For example, the SD may indicate an owner or an entity that manages the network slice (e.g., carrier) and/or the entity that the is providing the application/service via the network slice (e.g., a third-party, the entity that provides the application or service, etc.). In some embodiments, the same entity may own the slice and provide the service (e.g., carrier services). Throughout this description, S-NSSAI refers to a single network slice and NSSAI may generally refer to one or more network slices.

An example of generating the exemplary dedicated priority information for network slicing is provided below with regard to the description of the signaling diagram 300 of FIG. 3. The signaling diagram 300 will describe a scenario in which dedicated priority information is generated by the RAN 120 based on information such as, but not limited to, NSSAI, S-NSSAI and an index to radio access technology (RAT)/frequency selection (RFSP index).

An access and mobility management function (AMF) of the core network 130 may provide an RFSP index to the RAN 120 via the N2 interface. The RFSP may take into account the "subscribed S-NSSAI" of the UE 110. Those skilled in the art will understand that the term "subscribed S-NSSAI" may refer to S-NSSAI based on subscriber information which the UE 110 is subscribed to use in a PLMN. The RAN 120 may then map the RFSP index to locally defined configurations to apply specific radio resource management strategies. For example, the RFSP index may be used by the RAN 120 to derive UE 110 specific cell reselection priorities that may control idle mode camping behavior of the UE 110. The UE 110 specific reselection priorities may be provided to the UE 110 as dedicated priority information. The exemplary embodiments include implementing multiple RFSP indexes for the UE 110 that each correspond to a different network slice. This may enable the RAN 120 to generate exemplary dedicated priority information for network slicing on a per slice basis.

Figure 3:
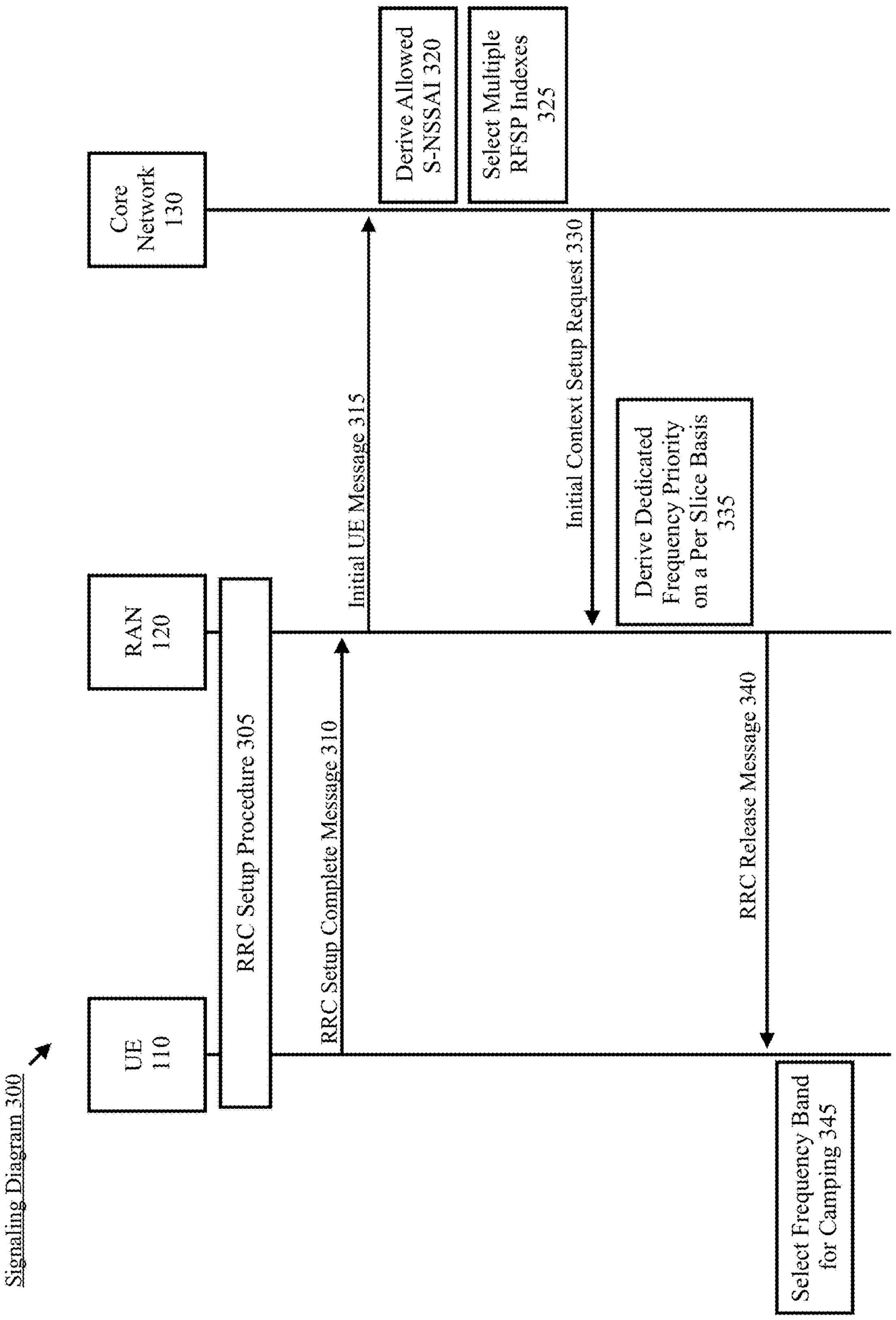
FIG. 3 shows a signaling diagram for implementing a dedicated priority configuration for radio access network (RAN) slicing according to various exemplary embodiments.

FIG. 3 shows a signaling diagram 300 for implementing a dedicated priority configuration for RAN slicing according to various exemplary embodiments. The signaling diagram 300 will be described with regard to the network arrangement 100 of FIG. 1 and the UE 110 of FIG. 2. The signaling diagram 300 includes the UE 110, the RAN 120 and the core network 130.

In 305, an RRC setup procedure is performed between the UE 110 and the RAN 120 via a currently camped cell. For example, the UE 110 and the cell 120A may participate in a signaling exchange for the RRC setup procedure. As indicated above, when this connection is released, the UE 110 may be provided with dedicated priority information for subsequent cell reselection.

In 310, the UE 110 may transmit an RRC setup complete message to the RAN 120 via the currently camped cell. The RRC setup complete message may include requested NSSAI. Those skilled in the art will understand that the term "requested NSSAI" may refer to NSSAI provided by the UE 110 to the serving PLMN during a registration procedure. In addition, the RRC setup complete message may include other information such as, but not limited to, a registration request.

In 315, the RAN 120 may transmit an initial UE message to the core network 130. For example, the RAN 120 may select one of the AMFs of the core network 130. Those skilled in the art will understand that an AMF is a network function and may perform operations related to mobility management such as, but not limited to, paging, non-access stratum (NAS) management and registration procedure management between the UE 110 and the core network 130. The RAN 120 may transmit the initial UE message to the selected AMF in response to the registration request received from the UE 110.

In 320, the core network 130 derives allowed NSSAI. Those skilled in the art will understand that the term "allowed S-NSSAI" may refer to NSSAI provided by the serving PLMN that includes S-NSSAI values the UE 110 is permitted to use in the serving PLMN for the current registration area. The allowed NSSAI may be derived based on the requested NSSAI and local configuration information provided by the RAN 120 during NG setup. The rejection criteria may be based on UE 110 subscription information, local configurations, RAN capabilities, load level for a network slice, etc.

In 325, the core network 130 selects multiple RFSP indexes associated with the UE 110. For example, the core network 130 may maintain multiple RFSP indexes for the UE 110 and each RFSP index may correspond to a particular network slice (e.g., S-NSSAI). As will be described in more detail below, the per slice RFSP indexes may be used to derive per slice frequency priority information. The AMF may choose the multiple RSFP indexes based on the subscribed RFSP indexes, the locally configured operator's policies, the allowed NSSAI, the UE related context information available locally at the AMF or on any other appropriate factor.

In 330, the core network 130 transmits an initial context setup request to the RAN 120. The initial context setup request may include, but is not limited to, the allowed NSSAI derived in 320, the multiple RFSP indexes selected in 325, UE radio capability information, UE security capabilities, packet data network (PDN) session setup, etc. The RAN 120 may then use this information to generate the dedicated priority configuration information.

In 335, the RAN 120 derives dedicated frequency priority on a per slice basis. This information may then be transmitted to the UE 110 as the exemplary dedicated priority information. For example, each of the RFSP indexes may correspond to one of the network slices (e.g., the allowed S-NSSAI). The RAN 120 may then derive a frequency priority list for each of these network slices. The per network slice frequency priority may be used by the UE 110 when selecting a frequency band for camping. Thus, unlike conventional approaches, the dedicated priority information may include network slice information and the UE 110 may be aware of whether a RAN slice is deployed on a particular frequency band prior to selecting a frequency band for camping in a subsequent cell reselection procedure.

In 340, the RAN 120 transmits an RRC release message to the UE 110. The RRC release message may include the exemplary dedicated priority information. Those skilled in the art will understand that the network may be triggered to release the connection for any of a variety of different reasons. The exemplary embodiments are not limited to an RRC release being triggered for any particular reason and may apply to an RRC release in any deployment scenario where multiple RAN slices are deployed on multiple frequency bands.

In 345, the UE 110 selects a frequency band for camping. For example, in response to the RRC release message, the UE 110 may initiate cell reselection in accordance with the dedicated priority information. This targeted cell reselection procedure may consider whether a desired network slice is deployed on a frequency band prior to selecting the frequency band for camping. The network slice that the UE 110 intends to utilize may be a "configured S-NSSAI." Those skilled in the art will understand that the term "configured S-NSSAI" refers to NSSAI provisioned in the UE 110 that is applicable to one or more PLMNs. Thus, the UE 110 may select a frequency band for camping based on the desired configured S-NSSAI and the corresponding dedicated frequency priority information. For example, UE 110 may select a frequency band of cell 120B based on the dedicated priority configuration. Once camped, the UE 110 may access the intended network slice because the corresponding RAN slice is deployed on this frequency band. Thus, the UE 110 may then establish a protocol data unit (PDU) session with the intended network slice.

The exemplary embodiments also include techniques for determining whether the dedicated priority configuration is relevant to where the UE 110 is currently located. For instance, the dedicated priority information may only be relevant to a small area. When the UE 110 moves out of this area, the dedicated configuration information may not be correct anymore. This may create a scenario in which the UE 110 selects a frequency band for camping that does not support the intended network slice because the UE 110 is using dedicated priority information that is not relevant to where the UE 110 is currently located.

Under conventional circumstances, the dedicated priority configuration may be implemented based on a timer (e.g., T32). For example, the dedicated priority information may override default cell reselection when the timer is running locally at the UE 110. However, this timer based validity approach has been identified as inadequate for a deployment scenario that includes multiple RAN slices deployed on multiple frequency bands. The exemplary embodiments include dedicated priority configuration validity techniques that may be tailored towards a deployment scenario in which multiple RAN slices are deployed on multiple frequency bands. These exemplary techniques may be used in conjunction with this conventional timer or any other currently implemented dedicated priority configuration validity techniques, future implementations of dedicated priority configuration validity techniques or independently from other dedicated priority configuration validity techniques.

In some embodiments, the RRC release message may include a validity parameter associated with the dedicated priority information. As will be described in more detail below, the UE 110 may check the validity parameter to determine whether the dedicated priority configuration is to be used for cell reselection. In one example, the validity parameter may include a list of one or more cell IDs (e.g., physical cell ID (PCI), cell global identity (CGI), etc.). In another example, the validity parameter may include a list of one or more tracking area codes (TACs). In a further example, the validity parameter may include geographical information.

During operation, when the UE 110 moves to a new cell after receiving the dedicated priority information, the UE 110 may be configured to check the validity parameter prior to attempting to access the intended network slice. For example, if the validity parameter is a list of cell IDs, the UE 110 may determine whether the currently camped cell is included in the list of cell IDs. If the cell ID of the currently camped cell is included in the list of cell IDs, the dedicated priority configuration may be considered valid and thus, the UE 110 may operate in accordance with the dedicated priority configuration. If the cell ID of the currently camped cell is not included in the list of cell IDs, the dedicated priority configuration may not be valid and thus, the UE 110 may operate in accordance with the configuration information broadcast by currently camped cell.

In some embodiments, when the dedicated priority configuration is not valid, the UE 110 may keep the validity timer running (e.g., T320). Thus, if the UE 110 moves to another cell prior to the expiration of the timer, the UE 110 may once again check the validity parameter associated with the dedicated priority configuration.

To provide an example, consider a scenario in which three areas overlap (area 1, area 2, area 3). In this example, the dedicated priority configuration is valid for area 1 and area 2 but it is not relevant to area 3. When the UE 110 moves from area 1 to area 3, the UE 110 may check the validity parameter and determine that the dedicated priority configuration is not relevant to the currently camped cell of area 3. Thus, the UE 110 may select a frequency band based on information broadcast by the cell (e.g., system information broadcast (SIB), etc.). If the UE 110 then moves from area 3 to area 2 when the timer is still running, the UE 110 may check the validity parameter and determine that the dedicated priority configuration is relevant to the currently camped cell of area 2. Thus, the UE 110 may select a frequency band based on the dedicated priority configuration. However, if the timer has expired, the UE 110 may select a frequency band based on information broadcast by the cell.

In some embodiments, the validity parameter may be a TAC. Thus, instead of comparing cell IDs, the UE 110 may compare the TAC of the currently camped cell to the one or more TACs included in the validity parameter. If the TAC of the currently camped cell matches a TAC included in the validity parameter, the UE 110 may operate in accordance with the dedicated priority configuration. Otherwise, the UE 110 may operate in accordance with the information broadcast by the currently camped cell. In other embodiments, the validity parameter may be based on geographic information. Thus, instead of comparing Cell IDs or TACs, the UE 110 may compare its current location to the geographic information included in the validity parameter. If the current location of the UE 110 is encompassed by the geographic location information, the dedicated priority configuration may be applicable to the UE 110.

In a second aspect, the exemplary embodiments include techniques for identifying an association between a network slice and a paging message. Under conventional circumstances, there is no paging cause configured for network slices. Therefore, in response to paging, the UE 110 may attempt to try access on a carrier which does not support the network slice that is trying to communicate with the UE 110 via the paging message.

Figure 4:
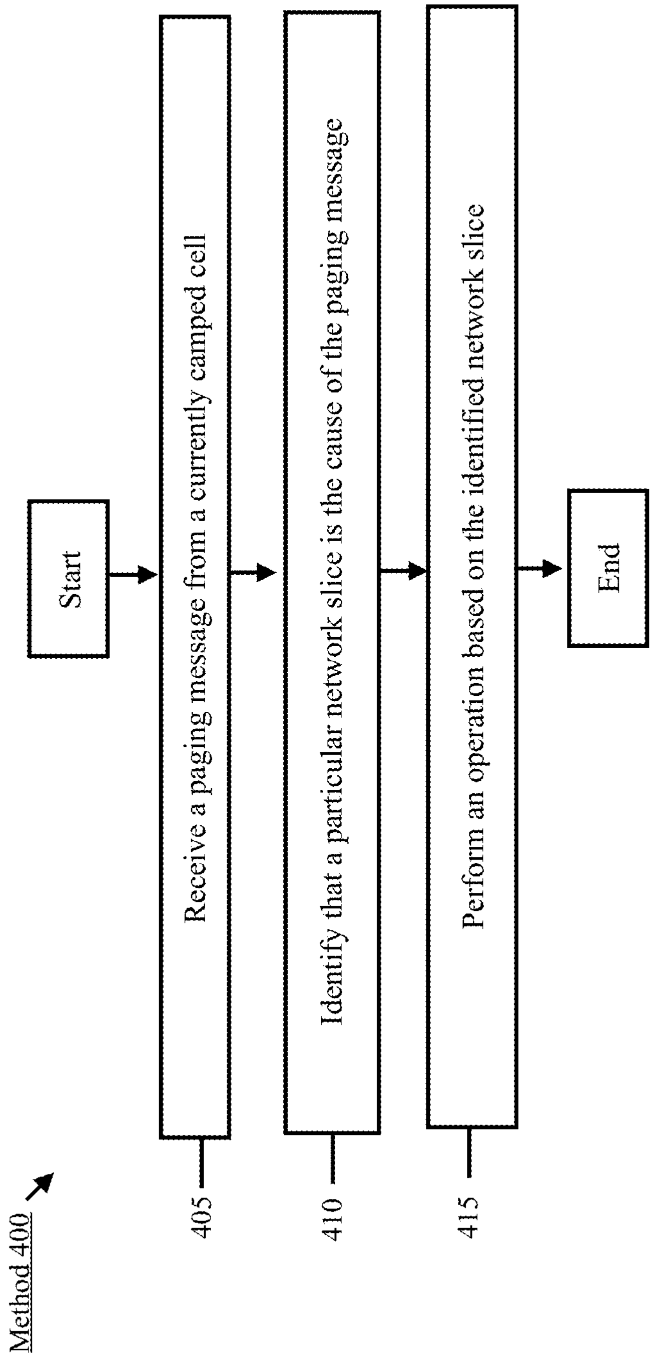
FIG. 4 shows a method for identifying an association between a network slice and a paging message according to various exemplary embodiments.

FIG. 4 shows a method 400 for identifying an association between a network slice and a paging message according to various exemplary embodiments. The method 400 is described with regard to the network arrangement 100 of FIG. 1 and the UE 110 of FIG. 2.

In 405, the UE 110 receives a paging message from a currently camped cell. For example, the UE 110 may be camped on cell 120A. When camped, the cell may broadcast a paging message addressed to the UE 110.

In 410, the UE 110 identifies that a particular network slice is the cause to the paging message. In some embodiments, the paging message may include network slice information. Thus, the UE 110 may identify the network slice associated with the paging message based on an explicit indication included in the paging message.

In other embodiments, slice specific paging occasions (POs) may be implemented. For example, different slice specific POs may be differentiated based on their corresponding search space. Thus, the network may configure multiple paging search spaces that are each associated with a different network slice. In this example, the UE 110 is able to identify that a particular network slice is the cause of the paging message based on the paging search space on which the paging message was received. Under conventional circumstances, the network may configure a physical downlink control channel (PDCCH) search space (e.g., paging-searchspace). In some embodiments, the pagingsearchspace parameter may be replaced with the list of slice specific paging search spaces.

In some embodiments, multiple repetitions of POs may be configured, and each repetition may be associated with a particular network slice. For example, on the network side, multiple POs may be configured for the UE 110 and each PO may correspond to one slice specific paging message. The multiple POs may include a default PO that is configured to accommodate paging messages which do not support this feature. If the UE 110 is configured to use multiple network slices, the UE 110 may monitor multiple POs subsequently. The UE 110 may then identify the network slice that is the cause of the paging message based on which PO the UE 110 receives the paging message.

Figure 5:
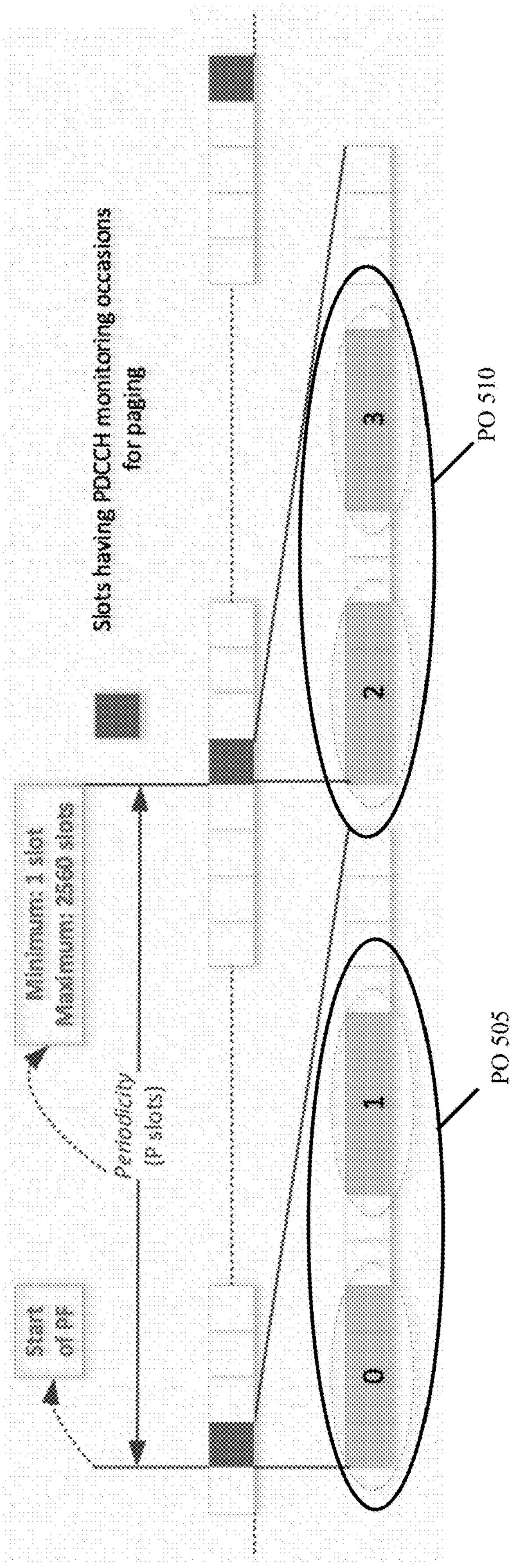
FIG. 5 shows an example of multiple repetitions of paging occasions (POs) for identifying the cause of a paging message according to various exemplary embodiments.

FIG. 5 shows an example of multiple repetitions of POs for identifying the cause of a paging message according to various exemplary embodiments. In this example, the PO 505 is associated with a first network slice and PO 510 is associated with a second different network slice. If the UE 110 receives a paging message during PO 505, the UE 110 may identify that the cause of the paging message is the first network slice. If the UE 110 receives the paging message during PO 510, the UE 110 may identify that the cause of the paging message is the second network slice.

Returning to the method 400, in some embodiments, the network may configure the UE 110 with multiple temporary mobile subscriber identities (TMSIs). The UE 110 may use different TMSIs (e.g., shortened global unique temporary identifier (5G-S-TMSI)) to monitor different POs that are associated with different network slices. The network may allocate the TMSIs to the UE 110 during a NAS registration request and accept procedure. For example, the UE 110 may transmit a registration request that include a list of requested NSSAI. The network may respond with a registration accept message that include a TMSI (e.g., 5G-S-TMSI) for each allowed NSSAI. The UE 110 may then monitor for paging messages according to the following formula where the subframe number (SFN) and paging frame (PF) are determined.

$$(SFN + PF_{offset}) \bmod T = \left(\frac{T}{N}\right) * (UE_{Id} \bmod N)$$

Here, the $UE_{Id}$ may be equal to the 5G-S-TMSI mod 1024. The UE 110 may perform this calculation for each of the TMSIs allocated by the network. Thus, the UE 110 may identify a network slice that is the cause of the paging messages received in 405 based on the TMSI that is being used to monitor the PO on which the paging message was received.

In other embodiments, slice specific paging radio network temporary identifier (P-RNTI) may be implemented. The network may scramble a message with a slice specific P-RNTI to indicate to the UE 110 the network slice that is the cause of the paging message. Thus, the UE 110 may identify which network slice is the cause of the paging message based on the P-RNTI that may be used to descramble the paging message received in 405. In one example, the slice specific P-RNTI may be fixed in the 3GPP specification. In another example, the RAN 120 may allocate multiple P-RNTI to the UE 110 through dedicated signaling. This may include the RAN 120 receiving a list of allowed NSSAI from the core network 130 and then the RAN 120 providing P-RNTI for each allowed NSSAI in an RRC reconfiguration message. In a further example, the UE 110 may calculate the multiple P-RNTIs based on its multiple 5G-S-TMSIs. This may include implementing a rule for both the RAN 120 and the UE 110 to align the calculation. For instance, 5G-S-TMSI values in a first range may be used for a first network slice and thus, may be mapped to the same P-RNTI. 5G-S-TMSI in a second range may be used for a second different network slice. Thus, a single UE 110 may be allocated with multiple P-RNTIs for multiple network slices.

In 415, the UE 110 performs an operation based on the identified network slice. For instance, the UE 110 may perform slice based unified access control (UAC) and/or a slice based random access channel (RACH) procedure for the identified network slice. Those skilled in the art will understand that UAC is a UE 110 based access barring mechanism that may occur prior to a RACH procedure and the RACH procedure may be used by the UE 110 to synchronize with a currently camped cell.

To provide an example, the UE 110 may perform a slice based UAC check for a target cell (e.g., cell 120A). The access barring check may be triggered when the UE 110 wants to transition to the RRC connected state or in response to any other appropriate type of predetermined condition. In this example, the access barring check may include determining whether a particular S-NSSAI or NSSAI that the UE 110 intends to access is supported by the target cell. This may include comparing the network slice identified in 410 to network slice information corresponding to the target cell. For instance, there may be a first UAC access category number for mobile originating (MO) signaling resulting from paging for slice (x) and a second different UAC access category for MO signaling resulting from paging for slice (y). The UE 110 may collect this type of information from any appropriate source. If the network slice identified in 410 matches the network slice information corresponding to the target cell, the UE 110 may attempt access via the target cell. If the network slice identified in 410 does not match the network slice information corresponding to the target cell, the UE 110 may camp on a different cell and once again perform slice based UAC.

In another example, the UE 110 may perform slice based random access. For instance, the UE 110 may be configured to use a particular RACH resource or preamble when attempting to access a first network slice and a different RACH resource or preamble when attempting to access a second different network slice. In other words, an aspect of the RACH procedure may correspond to the network slice the UE 110 is attempting to access. This implicitly indicates to the network which network slice the UE 110 is trying to access. However, the above examples are merely provided for illustrative purposes. The exemplary embodiments are not limited to any particular slice based UAC or RACH mechanism and may be used in conjunction with any appropriate slice based UAC mechanism or slice based RACH mechanism.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:

receiving a radio resource control (RRC) release message comprising network slice based dedicated priority information for the UE from a currently camped cell, wherein the network slice based dedicated priority information comprises a list of frequencies and one or more physical cell identifications (PCIs) corresponding to a network slice;

receiving geographic location information, wherein the network slice based dedicated priority information is only applicable when the current UE location is encompassed by the geographic location information;

selecting a frequency band for camping based on a configured network slice and the network slice based dedicated priority information when the current UE location is encompassed by the geographic location information; and establishing a protocol data unit (PDU) session with the configured network slice when camped on the frequency band.

2. The processor of claim 1, wherein the network slice based dedicated priority information includes a multiple frequency priority lists, each frequency priority list corresponding to a different network slice.

3. The processor of claim 1, the operations further comprising:

receiving a list of cell IDs, wherein the dedicated priority information is only applicable when a currently camped cell corresponds to a cell ID that is included in the list of cell IDs.

4. The processor of claim 1, the operations further comprising:

receiving a list of tracking area codes (TACs), wherein the dedicated priority information is only applicable when a currently camped cell corresponds to a TAC that is included in the list of TACs.

5. A user equipment (UE), comprising:

a transceiver configured to communicate with multiple networks; and a processor communicatively coupled to the transceiver and configured to perform operations comprising:

receiving a radio resource control (RRC) release message comprising network slice based dedicated priority information for the UE from a currently camped cell, wherein the network slice based dedicated priority information comprises a list of frequencies and one or more physical cell identifications (PCIs) corresponding to a network slice;

receiving geographic location information, wherein the network slice based dedicated priority information is only applicable when the current UE location is encompassed by the geographic location information;

selecting a frequency band for camping based on a configured network slice and the network slice based dedicated priority information when the current UE location is encompassed by the geographic location information; and establishing a protocol data unit (PDU) session with the configured network slice when camped on the frequency band.

6. The UE of claim 5, wherein each frequency priority list is generated by a radio access network (RAN) based on a radio access technology (RAT)/frequency selection (RFSP) index corresponding to a different network slice.

7. The UE of claim 5, the operations further comprising:

receiving a validity parameter, wherein the dedicated priority information is only applicable when the validity parameter is satisfied.

8. The UE of claim 7, the operation further comprising:

executing a validity timer, wherein the dedicated priority information is only applicable when the validity parameter is satisfied and the validity timer is running.

9. An apparatus comprising processing circuitry configured to:

process, based on signals received from a cell, a radio resource control (RRC) release message comprising network slice based dedicated priority information for the UE from a currently camped cell, the network slice based dedicated priority information includes a list of frequencies and one or more physical cell identifications (PCIs) corresponding to a network slice;

process, based on the signals received from the cell, geographic location information, wherein the dedicated priority information is only applicable when the current UE location is encompassed by the geographic location information;

select a frequency band for camping based on a configured network slice and the network slice based dedicated priority information when the current UE location is encompassed by the geographic location information; and establish a protocol data unit (PDU) session with the configured network slice when camped on the frequency band.

10. The processor of claim 9, wherein the network slice based dedicated priority information includes a multiple frequency priority lists, each frequency priority list corresponding to a different network slice.

11. The processor of claim 9, the operations further comprising:

process, based on the signals received from the cell, a list of cell IDs, wherein the dedicated priority information is only applicable when a currently camped cell corresponds to a cell ID that is included in the list of cell IDs.

12. The processor of claim 9, the operations further comprising:

process, based on the signals received from the cell, a list of tracking area codes (TACs), wherein the dedicated priority information is only applicable when a currently camped cell corresponds to a TAC that is included in the list of TACs.

13. The processor of claim 9, the operations further comprising:

process, based on the signals received from the cell, geographic location information, wherein the dedicated priority information is only applicable when the current UE location is encompassed by the geographic location information.

* * * * *